(12) United States Patent
Swartz et al.

(10) Patent No.: US 7,318,608 B2
(45) Date of Patent: Jan. 15, 2008

(54) RUNNING GEAR WITH INTEGRAL ENGINE SUPPORTS

(75) Inventors: Charles Swartz, Mocksville, NC (US); David Franklin Rowe, Jr., Advance, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 0 days.

(21) Appl. No.: 11/313,228

(22) Filed: Dec. 20, 2005

(65) Prior Publication Data

US 2006/0145439 A1    Jul. 6, 2006

Related U.S. Application Data

(60) Provisional application No. 60/638,530, filed on Dec. 23, 2004.

(51) Int. Cl.
*B60P 3/22* (2006.01)
(52) U.S. Cl. .............. 280/830; 280/789; 410/22; 410/3; 410/4; 410/7
(58) Field of Classification Search ........... 280/830, 280/789; 410/22, 3, 4, 7
See application file for complete search history.

(56) References Cited

U.S. PATENT DOCUMENTS

| | | | |
|---|---|---|---|
| 2,177,686 A | 10/1939 | Bracken et al. | |
| 2,177,687 A | 10/1939 | Bracken et al. | |
| 2,733,661 A | 2/1956 | Surgi | |
| 2,898,542 A | 8/1959 | Wasko et al. | |
| 3,731,896 A | 5/1973 | Fehlberg | |
| 4,117,342 A | 9/1978 | Melley, Jr. | |
| 4,556,247 A * | 12/1985 | Mahaffey | 322/1 |
| 4,921,231 A * | 5/1990 | Reynolds et al. | 267/196 |
| 5,269,424 A * | 12/1993 | Lyras | 209/2 |
| 6,715,195 B2 | 4/2004 | Erickson | |
| 6,749,379 B1 * | 6/2004 | Feld et al. | 410/22 |
| 6,836,222 B1 | 12/2004 | Carini | |
| 2002/0109345 A1 * | 8/2002 | Dufty | 280/789 |

* cited by examiner

*Primary Examiner*—Lesley D. Morris
*Assistant Examiner*—Marlon Arce-Dlaz
(74) *Attorney, Agent, or Firm*—Michael Best & Friedrich LLP

(57) ABSTRACT

A running gear support assembly for supporting a portable machine. The running gear support assembly includes a pair of wheel hubs, an axle beam supported between the pair of wheel hubs, and at least one support bracket. The support bracket is coupled to the axle beam and configured to support the portable machine. Substantially the entire weight of the portable machine is supported by the axle beam.

18 Claims, 3 Drawing Sheets

US 7,318,608 B2

RUNNING GEAR WITH INTEGRAL ENGINE SUPPORTS

RELATED APPLICATIONS

This application claims priority to U.S. Provisional Patent Application No. 60/638,530 filed on Dec. 23, 2004, titled "Running Gear with Integral Engine Supports," the entire content of which is incorporated herein by reference.

FIELD OF INVENTION

The invention relates to a support apparatus for transportation of portable machinery. More particularly, the invention relates to portable machinery including a running gear with integral engine supports.

BACKGROUND

Portable machinery such as air compressors and generators often use trailer-type frames with wheels and axles for mobility. A compressor assembly is usually mounted on a trailer equipped with running gear, including two wheels mounted on an axle. The trailer includes a support frame and a towing assembly. This method of transporting portable machinery usually requires a substantial structure to handle the weight of the machinery.

SUMMARY

In one embodiment, the invention provides a running gear support assembly for supporting a portable machine. The running gear support assembly includes a pair of wheel hubs, an axle beam coupled between the pair of wheel hubs, and at least one support bracket coupled to the axle beam. The axle beam supports substantially the entire weight of the portable machine.

In another embodiment, the invention provides a portable machine assembly for supporting a portable machine. The portable machine assembly includes a frame, a pair of wheel hubs, an axle beam coupled between the pair of wheel hubs, at least one attachment bracket coupled between the frame and the axle beam, and at least one support bracket coupled to the axle beam. The axle beam supports substantially the entire weight of the portable machine.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
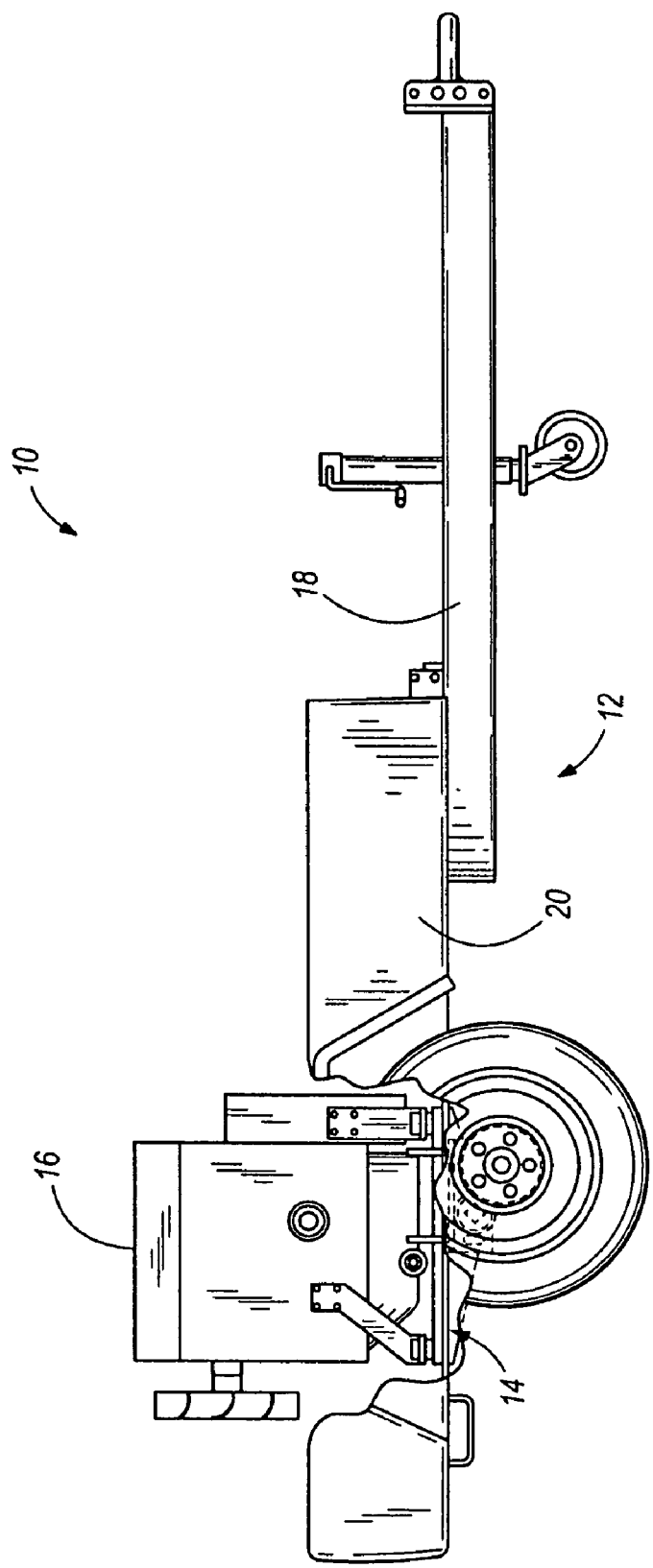
FIG. 1 is a side elevational view of a portable machine assembly.
Figure 2:
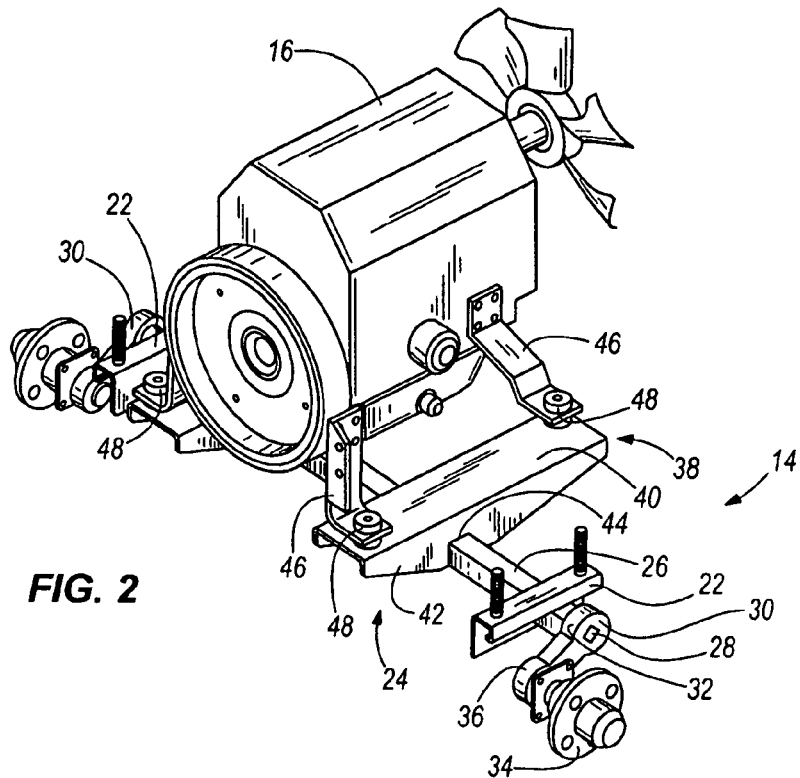
FIG. 2 is a partial perspective view of the portable machine assembly shown in FIG. 1 and showing a running gear support assembly.
Figure 3:
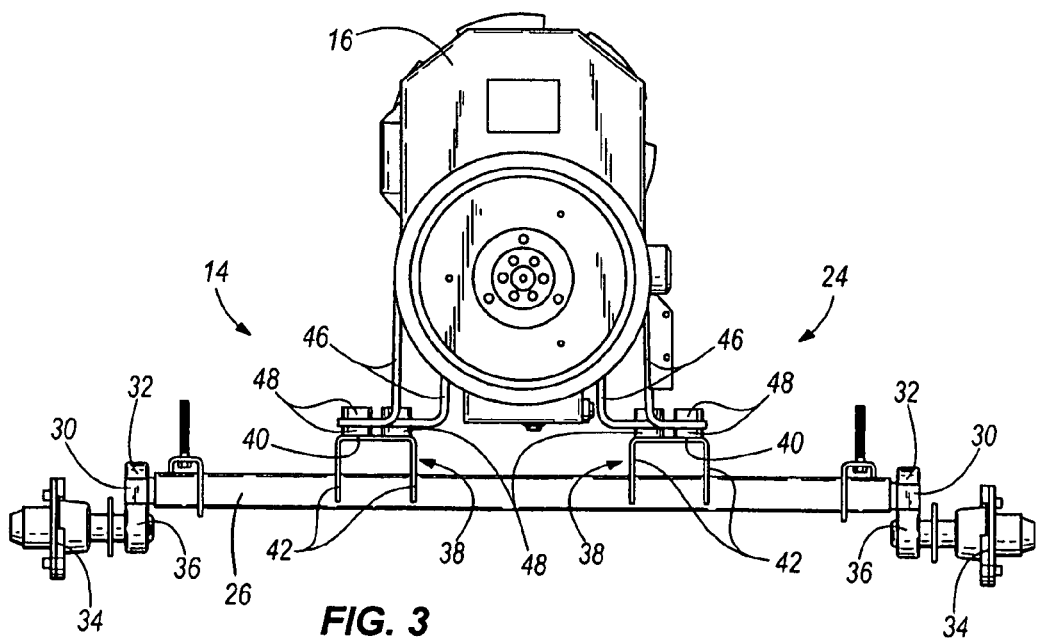
FIG. 3 is a front elevation view of the running gear support assembly shown in FIG. 2.
Figure 4:
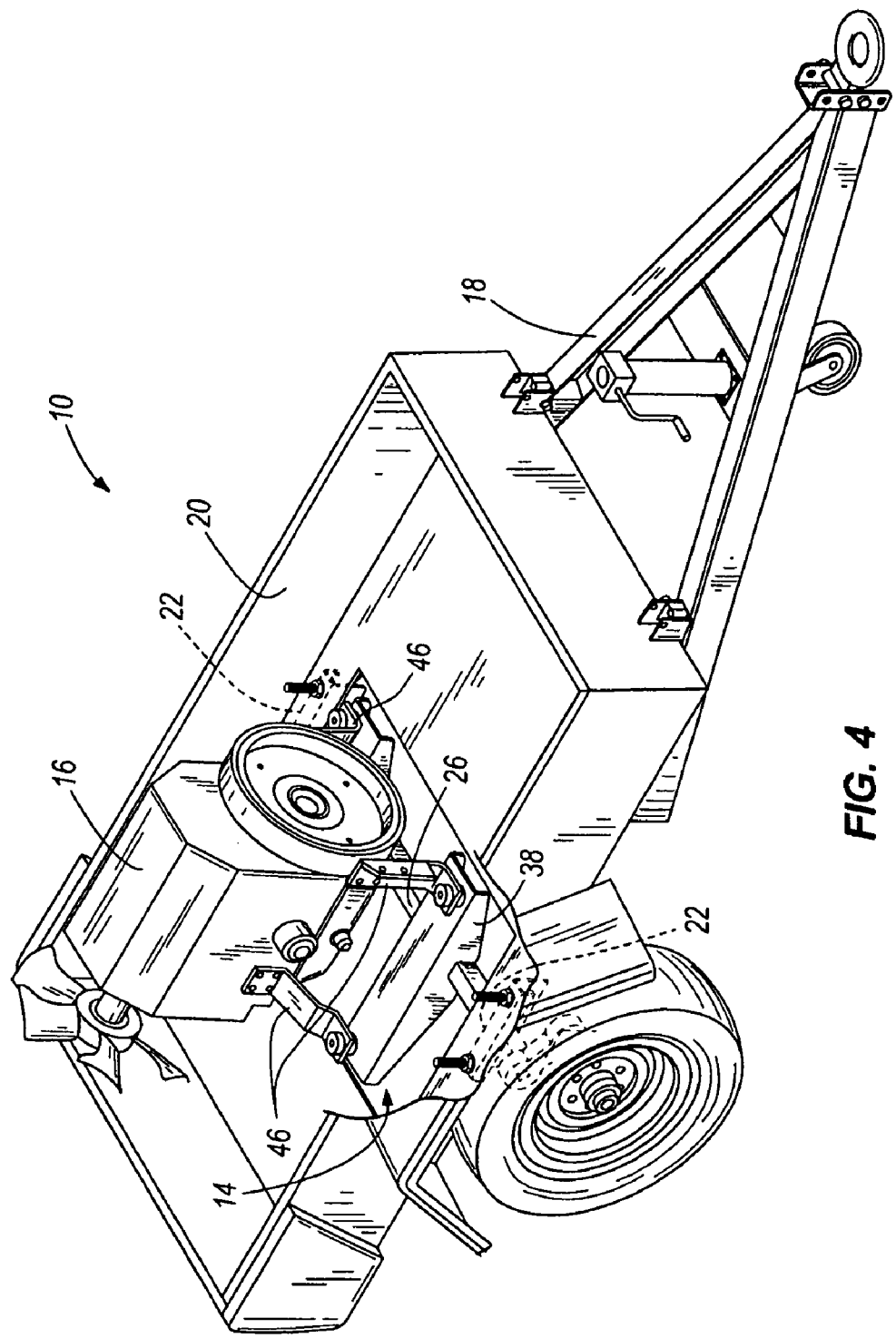
FIG. 4 is a perspective view of the portable machine assembly shown in FIG. 1.

FIGS. 1 and 4 illustrate a portable machine assembly 10 including a towable assembly or frame 12 and a running gear support assembly 14 (as also shown in FIGS. 2-3). The portable machine assembly 10 supports objects, such as engines, generators, compressors, batteries, tires, food, gardening supplies, tools, etc. As shown in FIG. 4, the towable frame 12 includes towable bars 18 that can be coupled to a towing vehicle (not shown), and a towable case 20 coupled to the running gear support assembly 14 with attachment brackets 22. In some embodiments, the attachment brackets 22 can include threaded bolts to couple the towable case 20 to the running gear support assembly 14. In other embodiments, the attachment brackets 22 can include other suitable means to couple the towable case 20 to the running gear support assembly 14.

In some embodiments, the running gear support assembly 14 supports an engine 16, as shown in FIGS. 1-4. However, the engine 16 shown in FIGS. 1-4 is only for illustration purposes. In other embodiments, the running gear support assembly 14 can support other relatively-heavy equipment, such as air compressors, electric generators, and refrigeration systems. The combined weight of objects other than the engine that can be supported by the towable frame 12 (i.e., batteries, tires, food, etc.) is generally less than the weight of the engine 16 supported by the running gear support assembly 14. As a result, the towable frame 12 may be manufactured of lighter and/or less expensive material than the running gear support assembly 14.

FIGS. 2-3 illustrate the running gear support assembly 14 including a running gear 24 having an axle beam 26. In one embodiment, the axle beam 26 includes a non-circular cross section. As shown in FIG. 2, a support extension 28 extends from each end of the axle beam 26. In one embodiment, the support extension 28 has a non-circular cross section. The running gear 24 also includes a torsion arm 30 at each end of the axle beam 26. Each torsion arm 30 includes a first end 32 having a corresponding non-circular bore for housing the non-circular support extension 28. The non-circular cross-section of each extension support 28 prevents the torsion arms 30 from rotating with respect to the axle beam 26. Additionally, each torsion arm 30 rotatably supports a wheel hub 34 at a second end 36. The wheel hubs 34 can rotate with respect to the torsion arms 30 and the axle beam 26 allowing movement of the towable frame 12 (as shown in FIGS. 1 and 4) without rotation of the axle beam 26.

As shown in FIGS. 2-3, the running gear 24 includes two support brackets 38. In other embodiments, the running gear support assembly 14 can include one bracket coupled to the running gear 24 to support the engine 16. Each support bracket 38 includes a support plate 40 and two connection plates 42 extending downwardly at an angle from the support plate 40. Each of the connection plates 42 includes a notch 44 that receives the axle beam 26. In one embodiment, each notch 44 defines a non-circular cross-section corresponding to the cross-section of the axle beam 26 to inhibit rotation of the support brackets 38 with respect to the axle beam 26. The cross-sections defined by the axle beam 26 and the support extensions 28 can define other suitable shapes allowing the connection plates 42, the attachment brackets 22, and the torsion arms 30 to avoid rotational movement with respect to the axle beam 26. Moreover, the connection plates 42, the attachment brackets 22, and the torsion arms 30 can be coupled to the axle beam 26 using suitable fastening methods, such as welding, press fitting, etc.

As shown in FIGS. 2-3, the running gear 24 also includes mounting brackets 46 to couple the engine 16 to the support brackets 38. The mounting brackets 46 and the support brackets 38 generally transfer the weight of the engine 16 to the axle beam 26. As shown in FIG. 3, the mounting brackets 46 are spaced apart to allow the engine 16 to be positioned between the mounting brackets 46. The mounting brackets 46 are coupled to the engine 16 and to the support plate 40. In other embodiments, the mounting brackets 46 can be used to support portable compressors or other relatively heavy-machinery. Moreover, the mounting brackets 46 can have configurations other than the configurations illustrated in FIGS. 1-4, and can be coupled to the supported machinery (i.e., engine 16, portable compressors, etc.) by suitable means. In some embodiments, the mounting brackets 46 can be used to couple the engine 16 directly to the axle beam 26 without the use of the support brackets 38. In other embodiments, the running gear support assembly 14 can include other brackets to transport additional pieces of machinery without using the towable frame 12. Thus, all or portions of the towable frame 12 may not be necessary to transport the engine 16 and additional pieces of machinery.

As shown in FIGS. 2-3, an isolation mount 48 is coupled to each mounting bracket 46 coupled to the support plate 40. The isolation mounts 48 generally include a rubber-like or resilient material to help prevent vibration of the engine 16 with respect to the running gear 24. As shown in FIG. 3, the isolation mounts 48 enclose the coupling means of the mounting brackets 46 and support plates 40. The isolation mounts 48 also help prevent excessive wear of the mounting brackets 46 and the support plates 40.

Various features and advantages of the invention are set forth in the following claims.

The invention claimed is:

1. A running gear support assembly for supporting a portable machine, the running gear support assembly comprising:
   a pair of wheel hubs;
   an axle beam coupled between the pair of wheel hubs;
   a towable frame coupled to the axle beam and the portable machine, such that the towable frame not supporting any substantial weight of the portable machine, the towable frame including a case positioned around at least a portion of the portable machine; and
   at least one support bracket coupling the portable machine to the axle beam, the axle beam supporting substantially the entire weight of the portable machine.

2. The running gear support assembly of claim 1, wherein the axle beam includes a non-circular cross-section.

3. The running gear support assembly of claim 1, wherein the at least one support bracket is rotationally fixed relative to the axle beam.

4. The running gear support assembly of claim 3, wherein the at least one support bracket is welded to the axle beam.

5. The running gear support assembly of claim 1, further comprising at least one mounting bracket to couple the portable machine to the at least one support bracket.

6. The running gear support assembly of claim 5, further comprising at least one isolation mount coupled between the at least one mounting bracket and the at least one support bracket.

7. The running gear support assembly of claim 1, further comprising at least one attachment bracket coupled between the running gear support assembly and the towable frame.

8. The running gear support assembly of claim 1, further comprising a torsion arm coupled to each end of the axle beam to rotatably support the pair of wheel hubs with respect to the axle beam.

9. The running gear support assembly of claim 1, wherein the portable machine is a portable generator.

10. The running gear support assembly of claim 1, wherein the portable machine is a compressor system.

11. A portable machine assembly for supporting a portable generator, the portable machine assembly comprising:
    a towable frame that does not support any substantial weight of the portable generator, the towable frame including a case positioned around at least a portion of the portable generator;
    a pair of wheel hubs;
    an axle beam coupled between the pair of wheel hubs;
    at least one attachment bracket coupled between the towable frame and the axle beam; and
    at least one support bracket coupling the portable generator to the axle beam, the axle beam supporting substantially the entire weight of the portable generator.

12. The portable machine assembly of claim 11, wherein the axle beam includes a non-circular cross-section.

13. The portable machine assembly of claim 11, wherein the at least one support bracket is rotationally fixed relative to the axle beam.

14. The portable machine assembly of claim 13, wherein the at least one support bracket is welded to the axle beam.

15. The portable machine assembly of claim 11, further comprising at least one mounting bracket to couple the portable generator to the at least one support bracket.

16. The portable machine assembly of claim 15, further comprising at least one isolation mount coupled between the mounting bracket and the at least one support bracket.

17. The portable machine assembly of claim 11, wherein the at least one attachment bracket is welded to the axle beam.

18. A running gear support assembly for supporting a portable machine having a first end, a second end, a top, and a bottom, the running gear support assembly comprising:
    a pair of wheel hubs;
    a linear axle beam coupled between the pair of wheel hubs, the linear axle beam positioned between the first end and the second end of the portable machine and beneath the bottom of the portable machine;
    a first support bracket coupling the portable machine directly to the linear axle beam, the first support bracket in line with the pair of wheel hubs; and
    a second support bracket coupling the portable machine directly to the linear axle beam, the second support bracket in line with the pair of wheel hubs.

* * * * *